(12) United States Patent
Hull et al.

(10) Patent No.: US 10,794,331 B2
(45) Date of Patent: Oct. 6, 2020

(54) SCRAMJETS AND ASSOCIATED AIRCRAFT AND METHODS

(71) Applicant: The Boeing Company, Chicago, IL (US)

(72) Inventors: John R. Hull, Sammamish, WA (US); James A. Grossnickle, Bellevue, WA (US); Dejan Nikic, Seattle, WA (US); Kevin G. Bowcutt, Aliso Viejo, CA (US)

(73) Assignee: The Boeing Company, Chicago, IL (US)

( * ) Notice: Subject to any disclaimer, the term of this patent is extended or adjusted under 35 U.S.C. 154(b) by 317 days.

(21) Appl. No.: 15/665,227

(22) Filed: Jul. 31, 2017

(65) Prior Publication Data
US 2019/0032603 A1   Jan. 31, 2019

(51) Int. Cl.
*F02K 7/00* (2006.01)
*F02K 7/14* (2006.01)
(Continued)

(52) U.S. Cl.
CPC ............... *F02K 7/14* (2013.01); *B64D 27/16* (2013.01); *F23D 11/32* (2013.01); *F23K 5/08* (2013.01);
(Continued)

(58) Field of Classification Search
CPC ... F02K 7/14; F23D 11/32; F23K 5/08; F23R 3/02; F23R 3/28; F23R 7/00;
(Continued)

(56) References Cited

U.S. PATENT DOCUMENTS 3,041,824 A    7/1962  Berhman
3,848,408 A *  11/1974 Tompkins ............... F02K 7/04
                                                    60/248
(Continued)

FOREIGN PATENT DOCUMENTS

JP    H04124445    4/1992
JP    H0688549     3/1994
(Continued)

OTHER PUBLICATIONS

Wikipedia, Electric arc, Feb. 5, 2014 (Year: 2014).*
(Continued)

*Primary Examiner* — Todd E Manahan
*Assistant Examiner* — Edwin Kang
(74) *Attorney, Agent, or Firm* — Dascenzo Intellectual Property Law, P.C.

(57) ABSTRACT

A scramjet includes a converging inlet, a combustor configured to introduce a fuel stream into an air stream in a combustion chamber and to combust the fuel air mixture stream to create an exhaust stream, and a diverging exit nozzle configured to accelerate the exhaust stream. The combustor includes a fuel injection system including at least one arcjet. A method of creating thrust for an aircraft includes compressing a supersonic incoming air stream in a converging inlet, injecting a fuel stream into the air stream in a combustion chamber to create a fuel air mixture stream, igniting the fuel air mixture stream to create an exhaust stream, and exhausting the exhaust stream from a diverging exit nozzle. The injecting the fuel stream into the air stream includes injecting the fuel stream at a fuel speed sufficient to create shear between the fuel stream and the air stream.

20 Claims, 4 Drawing Sheets

(51) Int. Cl.
| | |
|---|---|
| *B64D 27/16* | (2006.01) |
| *F23R 3/28* | (2006.01) |
| *F23R 3/02* | (2006.01) |
| *F23R 7/00* | (2006.01) |
| *F23D 11/32* | (2006.01) |
| *F23K 5/08* | (2006.01) |

(52) U.S. Cl.
CPC .................. *F23R 3/02* (2013.01); *F23R 3/28* (2013.01); *F23R 7/00* (2013.01); *F05D 2220/80* (2013.01); *F05D 2240/128* (2013.01); *F05D 2240/35* (2013.01); *F05D 2260/99* (2013.01); *F23K 2300/101* (2020.05)

(58) Field of Classification Search
CPC ....... F23R 2900/00009; F05D 2240/35; F05D 2220/10; F05D 2220/80; F23C 99/001; F02C 7/264; B64G 1/406; F03H 1/0093; F03H 1/0087; F03H 1/0081
See application file for complete search history.

(56) References Cited

U.S. PATENT DOCUMENTS

| | | | | |
|---|---|---|---|---|
| 4,548,033 A * | 10/1985 | Cann | ...................... | B64G 1/406 313/231.41 |
| 4,766,855 A | 8/1988 | Tozzi | | |
| 5,085,048 A * | 2/1992 | Kutschenreuter, Jr. | ... | F02K 7/10 60/740 |
| 5,280,705 A * | 1/1994 | Epstein | ...................... | F23R 3/28 60/247 |
| 2009/0165436 A1* | 7/2009 | Herbon | ................... | F23R 3/286 60/39.826 |
| 2009/0283058 A1* | 11/2009 | Modroukas | ............. | F02B 51/02 123/2 |
| 2011/0108639 A1* | 5/2011 | Hicks | .................... | F23D 11/383 239/533.9 |
| 2012/0138714 A1* | 6/2012 | Jacobsen | ............... | B05B 5/0255 239/690 |
| 2014/0338357 A1* | 11/2014 | Lovett | ....................... | F02C 7/22 60/776 |
| 2016/0327029 A1* | 11/2016 | Ziemba | ................. | F03H 1/0087 |
| 2017/0067637 A1* | 3/2017 | Ueno | ...................... | F23R 3/002 |

FOREIGN PATENT DOCUMENTS

| | | |
|---|---|---|
| RU | 2013150684 | 5/2015 |
| RU | 154901 | 9/2015 |
| WO | WO2008052830 | 5/2008 |
| WO | WO 2014160679 | 10/2014 |

OTHER PUBLICATIONS

Asim Kumar Roy Choudhury, Characteristics of light sources, 2014 (Year: 2014).*
Vural, Comprehensive Materials Processing, 2014 (Year: 2014).*
NASA, Brayton Cycle, 2008 (Year: 2008).*
Savelkin, Experiments on Plasma-Assisted Combustion in a Supersonic Flow: Optimization of Plasma Position in Relation to the Fuel Injector, Feb. 8, 2016 (Year: 2016).*
Kuo, Plasma Torch Igniters for a Scramjet Combustor, Jan. 2004 (Year: 2004).*
Jacobsen, Toward Plasma-Assisted Ignition in Scramjets, Jan. 2003 (Year: 2003).*
Prebola, Performance of a Plasma Torch With Hydrocarbon Feedstocks for Use in Scramjet Combustion, Aug. 1998 (Year: 1998).*
Masuya et al, Some Governing Parameters of Plasma Torch Igniter Flameholder in a Scramjet Combustor, Apr. 1993 (Year: 1993).*
Axdalh, A study of Premixed, Shock-Induced Combustion with Application to Hypersonic Flight, Dec. 2013 (Year: 2013).*
Goldfeld et al., "Ignition of hydrocarbon-air supersonic flow by volumetric ionization," Journal of Thermal Science, vol. 24, Issue 6, pp. 583-590, Nov. 2015.
"Improved fuel system for scramjets," Invention No. 11_2652, University of New South Wales, Sydney, Australia, pdf downloaded Jul. 24, 2017 from Innovations.UNSW.edu.au.
Machine-generated English translation of the abstract of JPH04124445, downloaded from Espacenet.com on Dec. 31, 2018.
Machine-generated English translation of the abstract of JPH0688549, downloaded from Espacenet.com on Dec. 31, 2018.
European Patent Office, Extended European Search Report for related European Application No. 18173751, dated Nov. 22, 2018.
Encyclopedia, Aviation, The Great Russian Encyclopedia, Central Aerohydrodynamic Institute, 1994, p. 637, 638.
Machine-generated English abstract for RU2013150684, downloaded from Espacenet.com on Jul. 12, 2019.
Machine-generated English abstract for RU154901, downloaded from Espacenet.com on Jul. 12, 2019.
Federal Institute of Intellectual Property, Office Action for related Russian Patent Application No. RU 2018117481, dated Apr. 18, 2019.
English translation for Federal Institute of Intellectual Property, Office Action for related Russian Patent Application No. RU 2018117481, dated Apr. 18, 2019.

* cited by examiner

SCRAMJETS AND ASSOCIATED AIRCRAFT AND METHODS

FIELD

The present disclosure relates to scramjets.

BACKGROUND

A ramjet is an air-breathing jet engine that uses the engine's forward motion to compress incoming air in a combustion chamber without an axial compressor. Supersonic combusting ramjets, also known as scramjets, are ramjets in which combustion occurs in a supersonic flow of a fuel-air mixture. The use of supersonic combustion can result in higher levels of performance at increased Mach numbers relative to what can be achieved with subsonic combustion, as in a ramjet or a turbojet. A primary engineering constraint in the design of scramjets relates to the short time available for igniting and completing the combustion of the fuel-air mixture. For example, a scramjet may have such a length and may be configured to operate at such a speed that air traverses the scramjet combustor in a time period that is on the order of 1 millisecond (ms). If the fuel is injected into the combustion chamber as a jet or in the form of droplets, the fuel must evaporate and diffuse into the air stream to produce an efficiently combustible fuel-air mixture. However, diffusion usually is a relatively slow process, resulting in inefficient mixing of fuel and air during the time scales in which the air traverses the combustion chamber. The inefficient mixing of fuel and air thus may result in a loss of potential thrust and/or a waste of fuel.

SUMMARY

Scramjets and associated aircraft and methods are disclosed herein. A scramjet includes a converging inlet configured to compress an incoming air stream, a combustor with a combustion chamber downstream of the converging inlet, and a diverging exit nozzle downstream of the combustion chamber. The combustor is configured to introduce a fuel stream into the air stream in the combustion chamber to create a fuel air mixture stream, and to ignite and combust the fuel air mixture stream to create an exhaust stream. The combustor includes a fuel injection system including at least one arcjet configured to inject the fuel stream into the air stream in the combustion chamber at a fuel speed that is sufficient to create shear between the fuel stream and the air stream. The diverging exit nozzle is configured to accelerate the exhaust stream to produce thrust of the scramjet.

A method of creating thrust for an aircraft includes compressing a supersonic incoming air stream in a converging inlet, injecting a fuel stream into the air stream in a combustion chamber downstream of the converging inlet to create a fuel air mixture stream, igniting the fuel air mixture stream in the combustion chamber, maintaining combustion of the fuel air mixture stream in the combustion chamber to create an exhaust stream, and exhausting the exhaust stream from a diverging exit nozzle downstream of the combustion chamber. The injecting the fuel stream into the air stream includes injecting the fuel stream at a fuel speed that is sufficient to create shear between the fuel stream and the air stream.

DESCRIPTION

Scramjets and associated aircraft and methods are disclosed herein. Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

Figure 1:
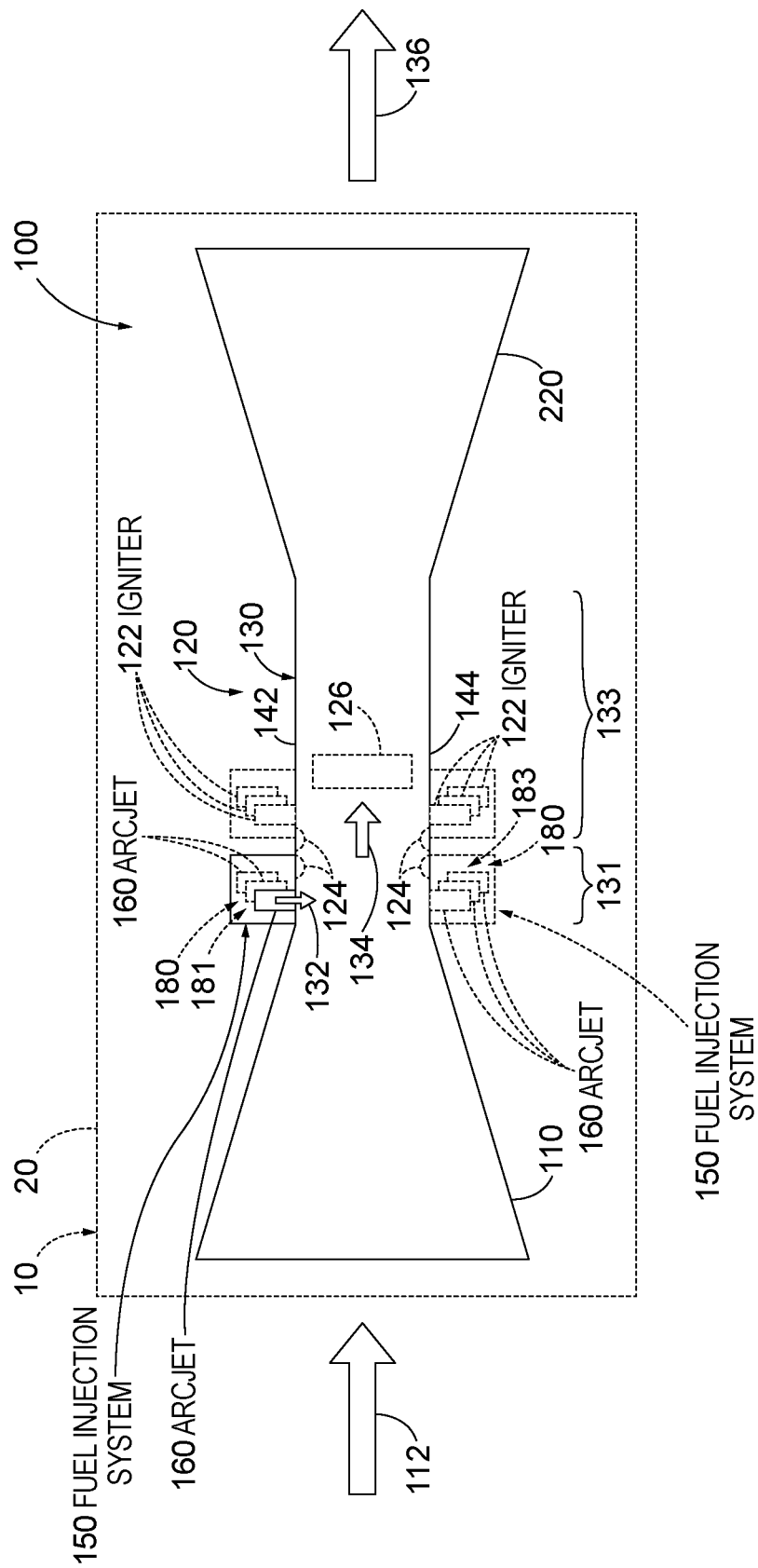
FIG. 1 is a schematic diagram representing scramjets and aircraft according to the present disclosure.

FIG. 1 is a schematic view of illustrative, non-exclusive examples of scramjets 100 according to the present disclosure, such as may be utilized in conjunction with aircraft 10. For example, and as schematically illustrated in FIG. 1, aircraft 10 may include an aircraft body 20 to which one or more scramjets 100 are secured, such as to provide thrust to aircraft 10. Aircraft 10 generally may be utilized to transport persons, cargo, and/or other payload, and may be a commercial aircraft, a military aircraft, or a weapon, such as a missile. Aircraft 10 that utilizes at least one scramjet 100 according to the present disclosure generally may be configured to operate at supersonic speeds, that is, speeds in excess of Mach 1. As used herein, a Mach number is intended to indicate a speed with respect to (i.e., divided by) a speed of sound in the ambient air, such as may be affected by properties of the ambient air such as temperature.

As schematically illustrated in FIG. 1, a scramjet 100 includes a converging inlet 110 configured to compress an incoming air stream 112, a combustor 120 with a combustion chamber 130 downstream of the converging inlet 110, and a diverging exit nozzle 220 downstream of the combustion chamber 130. The incoming air stream 112 may have an air speed (e.g., with respect to the converging inlet 110) that is supersonic, that is, greater than at least Mach 1. As more specific examples, the air speed of the incoming air stream 112 may be greater than Mach 2, greater than Mach 4, and/or greater than Mach 6. The combustor 120 is configured to introduce a fuel stream 132 into the air stream 112 within the combustion chamber 130 to create a fuel air mixture stream 134, and to ignite and combust the fuel air mixture stream 134 to create an exhaust stream 136. As schematically illustrated in FIG. 1, the combustion chamber 130 may include a mixing zone 131 in which the fuel stream 132 is mixed with the air stream 112 to create the fuel air mixture stream 134 and a combustion zone 133 downstream of the mixing zone 131, in which the fuel air mixture stream 134 is combusted. The diverging exit nozzle 220 is configured to accelerate the exhaust stream 136 to produce thrust. The combustor 120 includes a fuel injection system 150 with at least one arcjet 160 configured to inject the fuel stream 132 into the air stream 112 in the combustion chamber 130.

The fuel injection system 150 generally is configured to inject the fuel stream 132 into the combustion chamber 130 to create a shear between the fuel stream 132 and the air stream 112. The fuel injection system 150 may be characterized in terms of a fuel speed at which the fuel stream 132 is injected into the combustion chamber 130. For example, the fuel injection system 150 may be configured to inject the fuel stream 132 into the combustion chamber 130 at a fuel speed that is greater than or equal to an air speed of the incoming air stream 112 in the converging inlet 110. As used herein, the term "speed" is intended to refer to the magnitude of the corresponding velocity independent of a direction of the corresponding velocity. As examples, the fuel speed may be at least half, at least equal to, at least 2 times, at least 3 times, and/or at least 4 times the air speed of the incoming air stream 112. Such a mismatch between the fuel speed of the fuel stream 132 and the air speed of the air stream 112 may facilitate mixing of the fuel stream 132 and the air stream 112, such as by creating a shear between the fuel stream 132 and the air stream 112, thereby introducing turbulence to facilitate mixing of the fuel stream 132 and the air stream 112. Additionally, if a fuel injection pressure of the fuel stream 132 is greater than an inlet air pressure of the air stream 112, shock waves may form within the combustion chamber 130 to further enhance the fuel-air mixing. Utilizing an arcjet 160 to introduce the fuel stream 132 to the combustion chamber 130 may serve to achieve a fuel speed and/or a fuel pressure that is sufficient to produce shear and/or shock waves to increase a homogeneity of the fuel air mixture stream 134.

Additionally or alternatively, the fuel injection system 150 may be characterized in terms of a longitudinal fuel stream velocity component of the fuel stream 132 that is parallel to a flow direction of the incoming air stream 112. As examples, the fuel injection system 150 may be configured to inject the fuel stream 132 into the combustion chamber 130 with a longitudinal fuel stream velocity component with a magnitude that is at least half, at least equal to, at least 2 times, at least 3 times, and/or at least 4 times the air speed of the incoming air stream 112. Such a mismatch between the longitudinal fuel stream velocity component of the fuel stream 132 and the air speed of the incoming air stream 112 also may facilitate mixing of the fuel stream 132 and the air stream 112, such as by creating a shear between the fuel stream 132 and the air stream 112, thereby introducing turbulence to facilitate mixing of the fuel stream 132 and the air stream 112.

Figure 2:
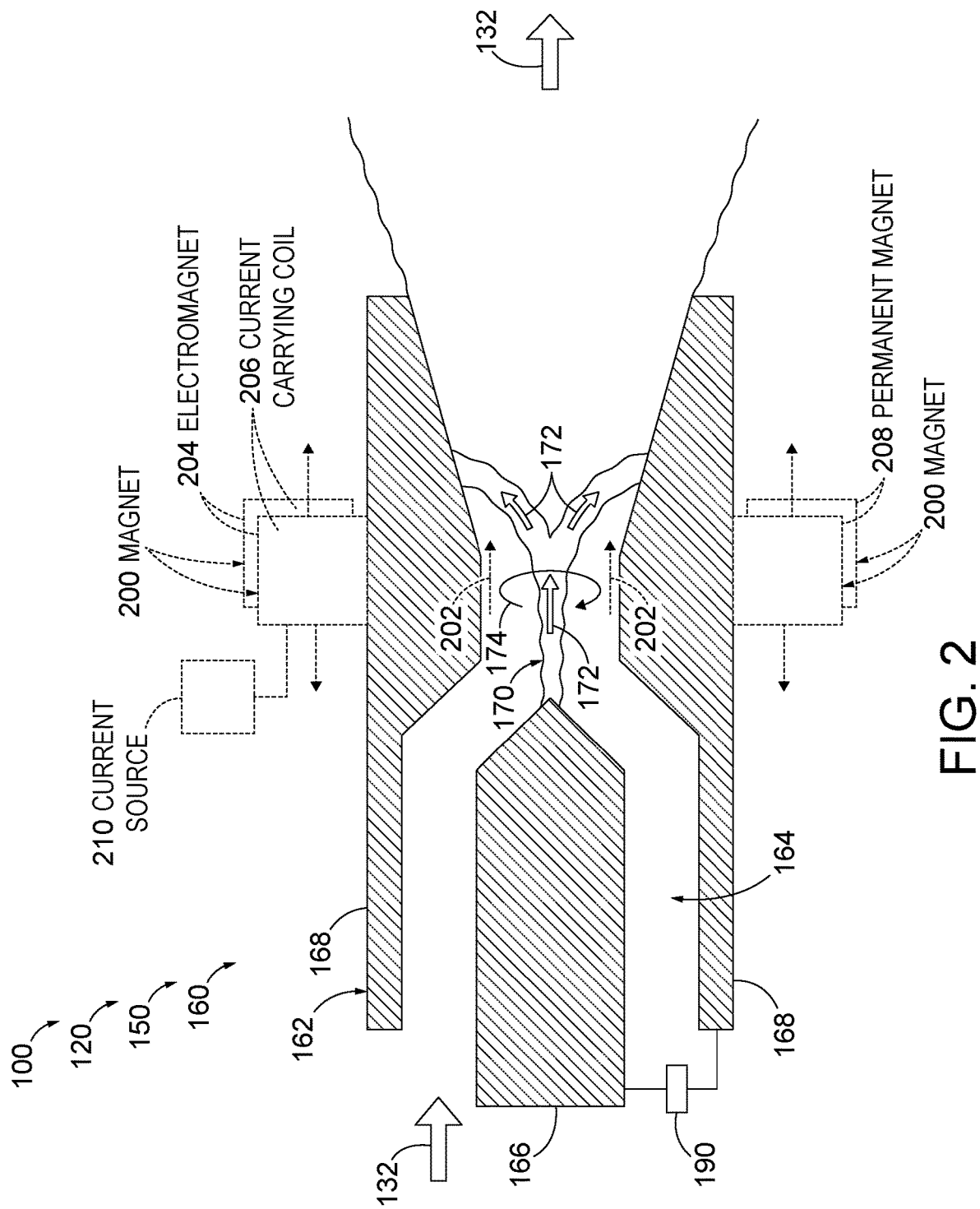
FIG. 2 is a schematic cross-sectional diagram representing fuel injection systems according to the present disclosure.

FIG. 2 provides a schematic cross-sectional illustration of an arcjet 160 according to the present disclosure. As schematically illustrated in FIG. 2, an arcjet 160 may include an arcjet body 162 that defines an internal volume 164 through which the fuel stream 132 flows. The arcjet 160 also may include a first electrode 166, a second electrode 168, and a voltage source 190 configured to apply a voltage across the first electrode 166 and the second electrode 168 to form an electrical arc 170 of ionized plasma between the first electrode 166 and the second electrode 168. More specifically, the arcjet body 162 may include and/or define the first electrode 166, and the second electrode 168 may extend into the internal volume 164 of the arcjet body 162. As an example, the arcjet 160 may be configured such that the first electrode 166 is a cathode with a positive voltage and the second electrode 168 is an anode with a negative voltage. However, this is not necessary, and it is additionally within the scope of the present disclosure that the arcjet 160 may be configured such that the first electrode 166 is an anode with a negative voltage and the second electrode 168 is a cathode with a positive voltage.

An arcjet 160 generally may be configured to accelerate the fuel stream 132 by imparting energy, such as heat energy, to the fuel stream 132 as the fuel stream 132 passes through the arc 170. The acceleration of the fuel stream 132 and/or the amount of energy added to the fuel stream 132 by the arcjet 160 may depend on the magnitude of the voltage supplied by the voltage source 190. In some examples, the voltage source 190 is an adjustable voltage source 190, such that the fuel injection system 150 is configured to adjust the fuel speed of the fuel stream 132 exiting the arcjet 160 by adjusting the voltage applied by the voltage source 190. For example, increasing the voltage applied across the first electrode 166 and the second electrode 168 by the voltage source 190 may increase the energy imparted to the fuel stream 132 that passes through the arc 170.

As indicated in FIG. 2, the arc 170 results in and/or corresponds to a current flow 172 between the first electrode 166 and the second electrode 168, which in turn produces a magnetic field 174 in the vicinity of the arc 170. The arc 170 also may serve to at least partially ionize the fuel stream 132 as it passes through the arc 170, and may serve to create a fuel stream 132 that is more thoroughly ionized near a centerline of the arcjet 160. When the fuel stream 132 is at least partially ionized, the speed and/or direction of a portion of the fuel stream 132 may be affected by the magnetic field 174, such as via a Lorentz force. Additionally, the ionization of the fuel stream 132 may serve to facilitate combustion of the fuel air mixture stream 134.

More specifically, and as schematically illustrated in FIG. 2, the arc 170 may include a current flow 172 that is generally aligned with a longitudinal extent of the arc 170, thus producing a magnetic field 174 that extends generally azimuthally around the current flow 172. The magnetic field 174 associated with the current flow 172 may serve to increase the fuel speed of the fuel stream 132 as the fuel stream 132 flows through and exits the arcjet 160. Thus, in an example in which the arcjet 160 includes an adjustable voltage source 190, adjusting the voltage applied across the first electrode 166 and the second electrode 168 by the voltage source 190 also may serve to adjust the fuel speed. Additionally or alternatively, the magnetic field 174 associated with the current flow 172 also may serve to increase a vorticity of the fuel stream 132 as the fuel stream 132 flows through and exits the arcjet 160. Thus, in an example in which the arcjet 160 includes an adjustable voltage source 190, adjusting the voltage applied across the first electrode 166 and the second electrode 168 by the voltage source 190 also may serve to adjust the vorticity of the fuel stream 132. Increasing the fuel speed and/or the vorticity of the fuel stream 132 exiting the arcjet 160 may serve to enhance mixing of the fuel stream 132 with the air stream 112 within the combustion chamber 130. Hence, the fuel injection system 150 also may be described as being configured to adjust the voltage supplied by the voltage source 190 to adjust a homogeneity of the fuel air mixture stream 134.

As further schematically illustrated in FIG. 2, in some examples of arcjets 160, the fuel injection system 150 further includes at least one magnet 200 associated with an arcjet 160, such that the magnet 200 is configured to produce a magnetic field 202 within the internal volume 164 of the arcjet 160. The magnetic field 202 may be configured to adjust a speed, trajectory, and/or vorticity of the fuel stream 132 as the fuel stream 132 flows through and exits the arcjet 160. The magnet 200 may be configured such that the magnetic field 202 augments, enhances, and/or otherwise modifies the magnetic field 174 associated with the current flow 172. In such an embodiment, the magnetic field 174 and the magnetic field 202 may be described as being cooperative magnetic fields. Each magnet 200 may extend circumferentially around the arcjet body 162. In such an embodiment, the magnet 200 also may be referred to as a solenoid 200. In an example in which the magnet 200 has the form of a solenoid, the magnetic field 202 may be generally aligned with an overall path of the fuel stream 132 through the arcjet body 162, and/or may spread out radially in an exhaust portion of the internal volume 164, such that the ionized fuel stream 132 may travel along a spiral trajectory around the field lines of the magnetic field 202, creating a vorticity within the fuel stream 132.

The magnetic field 202 may serve to alter a fuel speed and/or a vorticity of the fuel stream 132 as the fuel stream 132 flows through and exits the arcjet 160, and the magnet 200 may include and/or be any magnetic structure configured to produce a desired magnetic field 202. For example, a magnet 200 may include and/or be an electromagnet 204 that includes a current carrying coil 206, and the fuel injection system 150 further may include a current source 210 operably connected to the current carrying coil 206. In some such examples, the fuel injection system 150 may be configured to adjust the current in the current carrying coil 206 to adjust the magnetic field 202, such as to adjust the fuel speed of the fuel stream 132 and/or to adjust the vorticity of the fuel stream 132 as the fuel stream 132 exits the arcjet 160 and enters the air stream 112 to create the fuel air mixture stream 134. Because increasing the fuel speed and/or the vorticity of the fuel stream 132 exiting the arcjet 160 may serve to enhance mixing of the fuel stream 132 with the air stream 112 within the combustion chamber 130, fuel injection system 150 also may be described as being configured to adjust the current in the current carrying coil 206 to adjust the homogeneity of the fuel air mixture stream 134. Additionally or alternatively, and as schematically illustrated in FIG. 2, a magnet 200 may include and/or be a permanent magnet 208.

As schematically illustrated with dashed arrows in FIG. 2, one or more magnets 200 also may be configured to be selectively translated axially along the arcjet body 162 to alter the effect of magnetic field 202 on the fuel stream 132 as the fuel stream 132 exits the arcjet 160. For example, the fuel injection system 150 may be configured to translate a magnet 200 along the arcjet body 162 to adjust the fuel speed and/or the vorticity of the fuel stream 132 as the fuel stream 132 exits the arcjet 160. Hence, the fuel injection system 150 also may be described as being configured to translate the magnet 200 along the arcjet body 162 to adjust the homogeneity of the fuel air mixture stream 134.

An arcjet 160 may be configured to inject the fuel stream 132 into the air stream 112 at any appropriate angle and/or orientation with respect to the air stream 112. For example, the air stream 112 may have an air stream flow direction through the combustion chamber 130, and an arcjet 160 may be characterized by a fuel injection angle that is measured from a fuel stream flow direction of the fuel stream 132 exiting the arcjet 160 and the air stream flow direction. As examples, an arcjet 160 may have a fuel injection angle that is acute (i.e., between 0 degrees and 90 degrees, such that the fuel stream flow direction is directed at least partially upstream with respect to the air stream 112), obtuse (i.e., between 90 degrees and 180 degrees, such that the fuel stream flow direction is directed at least partially downstream with respect to the air stream 112), or 90 degrees (i.e., such that the fuel stream flow direction is perpendicular to the air stream flow direction). Additionally or alternatively, an arcjet 160 may be configured such that the fuel stream flow direction may be selectively and/or actively adjusted to adjust the homogeneity of the fuel air mixture stream 134.

Figure 3:
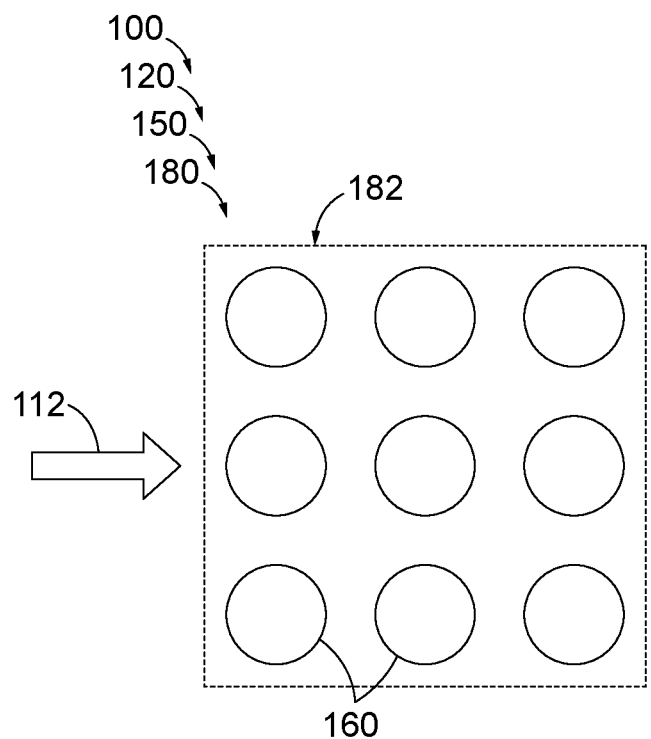
FIG. 3 is a schematic diagram representing fuel injection systems according to the present disclosure.
Figure 4:
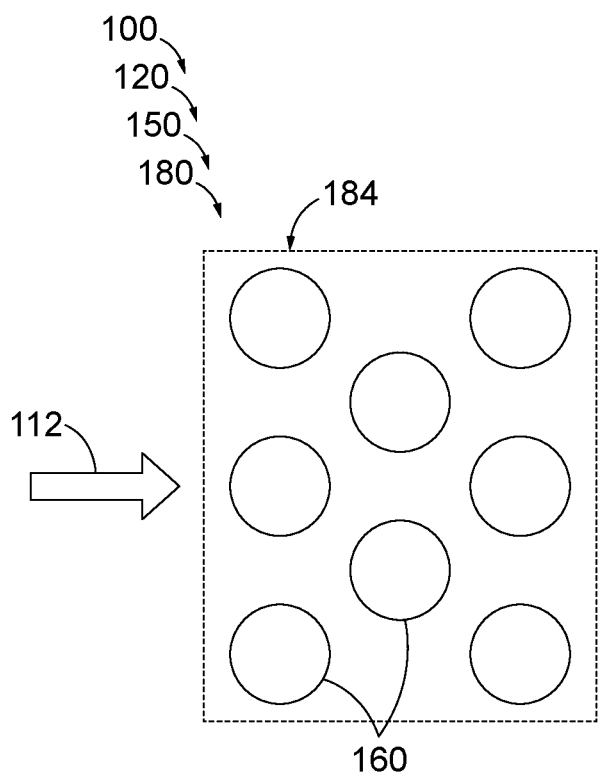
FIG. 4 is another schematic diagram representing fuel injection systems according to the present disclosure.

Turning now to FIGS. 3-4, the fuel injection system 150 may include an array 180 of arcjets 160. An array 180 of arcjets 160 may include a plurality of arcjets 160, each of which may be characterized by a corresponding fuel injection angle. The fuel injection angles of the plurality of arcjets 160 may be identical, or at least substantially identical. Alternatively, at least one arcjet 160 of the plurality of arcjets 160 may be have a fuel injection angle that is different than a fuel injection angle of at least one other arcjet 160 of the plurality of arcjets 160. Additionally or alternatively, an array 180 of arcjets 160 may include a plurality of arcjets 160 in which at least one arcjet 160, and optionally each arcjet 160 of the plurality of arcjets 160, is configured to have a fuel injection angle, and/or to produce a fuel stream 132 with a fuel stream flow direction, that may be selectively and/or actively adjusted, such as to adjust the homogeneity of the fuel air mixture stream 134.

As schematically illustrated in FIG. 3, the array 180 of arcjets 160 may include and/or be a rectangular array 182 of arcjets 160. A rectangular array 182 of arcjets 160 may facilitate mixing of the fuel stream 132 with the air stream 112 via a slipstream effect in which a fuel stream 132 emitted by a given arcjet 160 is drawn into the fuel air mixture stream 134 by a fuel stream 132 emitted by an arcjet 160 upstream of the given arcjet 160. Additionally or alternatively, and as schematically illustrated in FIG. 4, the array 180 of arcjets 160 may include and/or be a staggered array 184 of arcjets 160. A staggered array 184 of arcjets 160 may facilitate mixing of the fuel stream 132 with the air stream 112 by introducing the fuel stream 132 into the air stream 112 at a broad distribution of locations. For example, a staggered array 184 of arcjets 160 may exhibit a greater areal density of arcjets 160 relative to a rectangular array 182 of arcjets 160, with a correspondingly greater flux density of fuel stream 132 being injected into the air stream 112. Similarly, such a configuration also may facilitate the introduction of turbulence as the fuel stream 132 enters the air stream 112.

An array 180 of arcjets 160 may be positioned with respect to the combustion chamber 130 in any appropriate manner. For example, the combustion chamber 130 may be generally cylindrical in shape, and the array 180 of arcjets 160 may extend circumferentially around the combustion chamber 130, and/or may form a single line of arcjets 160 distributed radially around the combustion chamber 130. As another example, and as schematically illustrated in FIG. 1, the combustion chamber 130 may have a generally rectangular cross-sectional profile, and the array 180 of arcjets 160 may include a first array 181 of arcjets 160 positioned on a first side 142 of the rectangular profile and a second array 183 of arcjets 160 positioned on a second side 144 of the rectangular profile opposite the first side 142. The array 180 of arcjets 160, and/or any arcjet 160 of the fuel injection system 150, may have any appropriate orientation with respect to the combustor 120. One or more arcjets 160 of the array 180 of arcjets 160 hay have a fuel injection angle that is selected to create a shear flow and/or to enhance mixing of the fuel stream 132 and the air stream 112. As examples, one or more arcjets 160 of the array 180 of arcjets 160 may have a fuel injection angle that is acute (i.e., between 0 degrees and 90 degrees, such that the fuel stream flow direction is directed at least partially upstream with respect to the air stream 112), obtuse (i.e., between 90 degrees and 180 degrees, such that the fuel stream flow direction is directed at least partially downstream with respect to the air stream 112), or 90 degrees (i.e., such that the fuel stream flow direction is perpendicular to the air stream flow direction).

The scramjet 100 may be configured to ignite the fuel air mixture stream 134 to produce thrust in any appropriate manner. For example, and as schematically illustrated in FIG. 1, the combustor 120 further may include at least one igniter 122 configured to ignite the fuel air mixture stream 134 downstream of the arcjet(s) 160. The igniter 122 may include and/or be any appropriate structure, such as a plasma torch, a plasma filament producer, and/or a microwave exciter.

In some examples, an igniter 122 may be configured to ignite the fuel air mixture stream 134 in the combustion chamber 130 only under a predetermined subset of operational conditions. For example, the igniter 122 may be configured to ignite the fuel air mixture stream 134 in the combustion chamber 130 only when the air speed of the air stream 112 is below a threshold speed, and the combustor 120 may be configured to spontaneously ignite the fuel air mixture stream 134 in the combustion chamber 130 when the air speed of the fuel air mixture stream 134 is at or above the threshold speed. Stated differently, the threshold speed of the fuel air mixture stream 134 may correspond to a speed at which a temperature and/or pressure of the fuel air mixture stream 134 within the combustion chamber 130 is sufficient to ignite the fuel air mixture stream 134 without an external ignition source such as an igniter 122. As examples, the threshold speed may be at most Mach 2, at most Mach 4, and/or at most Mach 6.

In some embodiments of scramjet 100, the combustor 120 may lack an igniter altogether, and thus may be configured only to spontaneously ignite the fuel air mixture stream 134 in the combustion chamber 130 as a result of properties of the air stream 112, the fuel stream 132, and/or the fuel air mixture stream 134. As examples, a temperature of the air stream 112 and/or a temperature of the fuel stream 132 when the fuel stream 132 is injected into the air stream 112 by one or more arcjets 160 may be sufficiently high to permit ignition of the fuel air mixture stream 134 without utilizing a distinct ignition source, such as an igniter 122, within the combustion chamber 130.

As schematically illustrated in FIG. 1, the combustor 120 further may include at least one turbulator structure 124 within the combustion chamber 130 configured to physically introduce turbulence into the fuel air mixture stream 134 as the fuel air mixture stream 134 passes through the combustion chamber 130. Stated differently, a turbulator structure 124 may be configured to enhance a mixing of the fuel stream 132 with the air stream 112 to enhance a homogeneity of the fuel air mixture stream 134. As examples, a turbulator structure 124 may include and/or be a wire turbulator, a porous mesh, and/or a diffuser structure. However, this is not required, and it is additionally within the scope of the present disclosure that the combustor 120 does not include a turbulator structure 124. In such an embodiment, the arcjet 160 may be configured to introduce the fuel stream 132 to the incoming air stream 112 in such a manner that a properly homogenous fuel air mixture stream 134 is achieved without the use of a turbulator structure 124. Moreover, in such examples, the absence of a turbulator structure 124 positioned in the path of the air stream 112 and/or of the fuel air mixture stream 134 may reduce a drag force on the scramjet 100 relative to a scramjet 100 that includes at least one turbulator structure 124.

As further schematically illustrated in FIG. 1, the combustor 120 additionally may include a flame holder structure 126 within the combustion chamber 130 configured to maintain combustion of the fuel air mixture stream 134 in the combustion chamber 130. However, this is not required, and it is additionally within the scope of the present disclosure that the combustor 120 does not include a flame holder structure 126. In such an embodiment, the combustor 120 may be configured such that the fuel air mixture stream 134 may be continuously combusted in a stable manner in the absence of a flame holder structure 126 within the combustion chamber 130. Moreover, in such examples, the absence of a flame holder structure 126 positioned in the path of the air stream 112 and/or of the fuel air mixture stream 134 may reduce a drag force on the scramjet 100 relative to a scramjet 100 that includes a flame holder structure 126.

Figure 5:
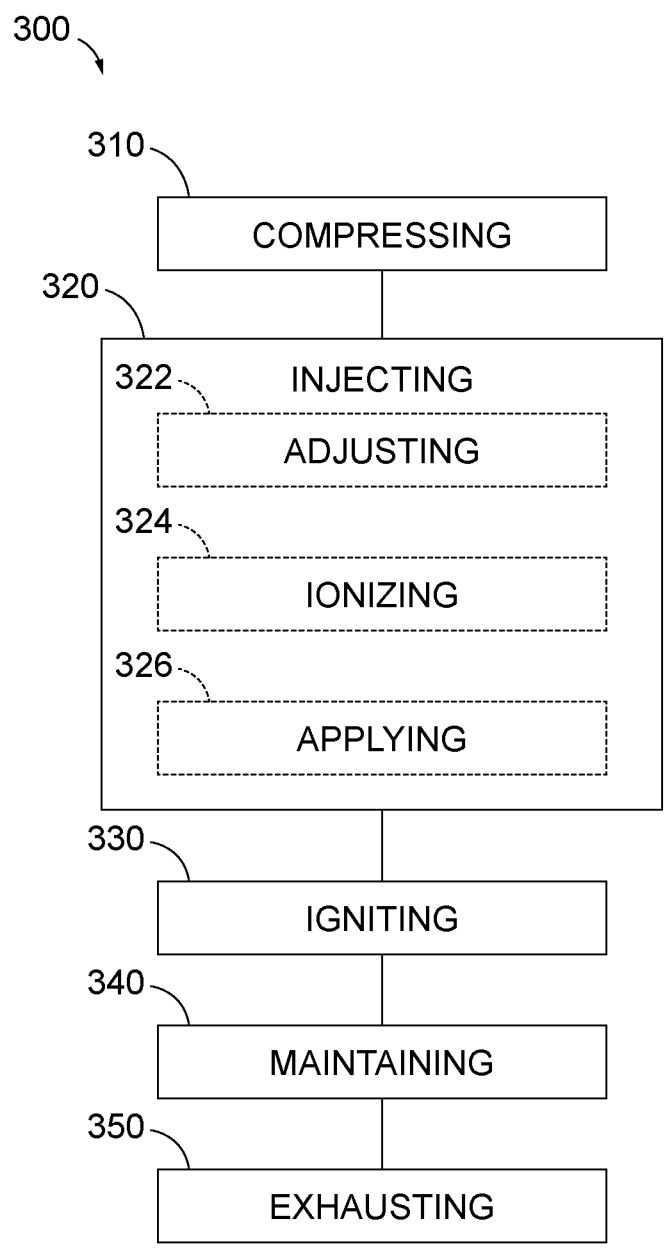
FIG. 5 is a flowchart schematically representing methods of creating thrust for an aircraft according to the present disclosure.

FIG. 5 schematically provides a flowchart that represents illustrative, non-exclusive examples of methods according to the present disclosure. In FIG. 5, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 5 are not limiting and other methods and steps are within the scope of the present disclosure, including methods having greater than or fewer than the number of steps illustrated, as understood from the discussions herein.

As seen in FIG. 5, a method 300 of creating thrust includes compressing 310 a supersonic incoming air stream (such as the incoming air stream 112) in a converging inlet (such as the converging inlet 110 of a scramjet 100) and injecting 320 a fuel stream (such as the fuel stream 132) into the air stream in a combustion chamber (such as the combustion chamber 130 of a scramjet 100) downstream of the converging inlet to create a fuel air mixture stream (such as the fuel air mixture stream 134). The method 300 further includes igniting 330 the fuel air mixture stream in the combustion chamber, maintaining 340 combustion of the fuel air mixture stream in the combustion chamber to create an exhaust stream (such as the exhaust stream 136), and exhausting 350 the exhaust stream from a diverging exit nozzle (such as the diverging exit nozzle 220 of a scramjet 100) downstream of the combustion chamber. A method 300 of creating thrust may utilize and/or be performed in conjunction with a scramjet 100 according to the present disclosure. However, this is not required, and it is additionally within the scope of the present disclosure that a method 300 may utilize and/or be performed in conjunction with any appropriate apparatus.

The injecting 320 may be performed such that the fuel stream and the incoming air stream combine to form a generally homogenous fuel air mixture stream. As discussed, the mixing of the fuel stream and the incoming air stream may be enhanced when the fuel stream is introduced into the incoming air stream at a high speed. As examples, an air speed of the incoming air stream may be greater than Mach 2, greater than Mach 4, and/or greater than Mach 6, and/or the injecting 320 may include injecting the fuel stream into the air stream at a fuel speed that is at least half, at least equal to, at least 2 times, at least 3 times, and/or at least 4 times the air speed of the incoming air stream. As discussed, injecting the fuel stream into the air stream at a fuel speed that differs from and/or exceeds the air speed of the incoming air stream may enhance mixing of the fuel stream and the incoming air stream through the formation of shear flows, shock waves, and/or turbulence between the fuel stream and the incoming air stream.

The injecting 320 may include injecting the fuel stream into the incoming air stream at any appropriate angle and/or in any appropriate direction to facilitate mixing of the fuel stream and the incoming air stream. For example, the injecting 320 may include injecting the fuel stream with a longitudinal fuel stream velocity component that is parallel to a flow direction of the incoming air stream. As examples, the longitudinal fuel stream velocity component may be at least half, at least equal to, at least 2 times, at least 3 times, and/or at least 4 times the air speed of the incoming air stream. Additionally or alternatively, the injecting 320 may include injecting the fuel stream into the incoming air stream with at least one fuel injection angle, as measured from a fuel stream direction of the fuel stream to an air stream flow direction of the incoming air stream. As examples, the injection 320 may include injecting with at least one fuel injection angle that is acute (i.e., between 0 degrees and 90 degrees, such that the fuel stream flow direction is directed at least partially upstream with respect to the air stream), obtuse (i.e., between 90 degrees and 180 degrees, such that the fuel stream flow direction is directed at least partially downstream with respect to the air stream), or 90 degrees (i.e., such that the fuel stream flow direction is perpendicular to the air stream flow direction). The injecting 320 further may include actively adjusting at least one fuel injection angle.

As indicated in FIG. 5, the injecting 320 may include one or more steps configured to adjust a property of the fuel stream as the fuel stream is injected into the air stream and/or to adjust a homogeneity of the fuel air mixture stream. As examples, and as indicated in FIG. 5, the injecting 320 may include adjusting 322 the fuel speed of the fuel stream as the fuel stream is injected into the air stream, ionizing 324 the fuel stream, and/or applying 326 a magnetic field (such as the magnetic field 174 and/or the magnetic field 202) to the fuel stream as the fuel stream is injected into the air stream. As discussed, the ionizing 324 may include passing the fuel stream through an arc of an arcjet (such as an arc 170 of an arcjet 160 of a scramjet 100), which may increase a combustibility of the fuel stream and/or enhance an effect of the magnetic field on the fuel stream. As discussed, the applying 326 the magnetic field may impart a vorticity to the fuel stream and/or accelerate the fuel stream as the fuel stream is injected into the air stream. Additionally, and as discussed, the applying 326 the magnetic field may include actively altering the magnetic field (such as a magnitude and/or spatial distribution thereof) to adjust a homogeneity of the fuel air mixture stream.

The injecting 320 may include injecting the fuel stream into the air stream in any appropriate spatial configuration. For example, in some methods 300, the injecting 320 includes injecting the fuel stream into the air stream from an array of discrete locations, such as from an array 180 of arcjets 160 within a scramjet 100. The array of discrete locations may assume any appropriate form. As examples, the array of discrete locations may include and/or be a rectangular array of discrete locations (such as a rectangular array 182 of arcjets 160 within a scramjet 100). As discussed, a rectangular array of arcjets may facilitate mixing of the fuel stream and the incoming air stream via a slipstream effect in which the fuel stream flow from a given arcjet serves to draw the fuel stream flow from an arcjet downstream of the given arcjet into the incoming airstream. Additionally or alternatively, the array of discrete locations may include and/or be a staggered array of discrete locations (such as a staggered array 184 of arcjets 160 within a scramjet 100). As discussed, a staggered array of arcjets may facilitate mixing of the fuel stream and the incoming air stream by increasing an overall flux of fuel into the incoming air stream and/or by increasing a degree of turbulence produced as the fuel stream is introduced into the incoming air stream.

A method 300 of creating thrust also may be performed without utilizing structures traditionally used for initiating and/or maintaining combustion. For example, the igniting 330 the fuel air mixture stream may include spontaneously igniting the fuel air mixture stream, and/or may include igniting without the use of an ignition source (such as an igniter 122). In an example in which an igniter is utilized to ignite the fuel air mixture stream, the igniting 330 may include igniting the fuel air mixture stream with the igniter only when the air speed of the air stream is below a threshold speed, and may include spontaneously igniting the fuel air mixture stream when the air speed of the fuel air mixture stream is at or above the threshold speed. As examples, the threshold speed may be at most Mach 2, at most Mach 4, and/or at most Mach 6. Additionally or alternatively, the maintaining 340 the combustion of the fuel air mixture stream may be accomplished without utilizing a flame holder structure (such as a flame holder structure 126) within the combustion chamber. Hence, a method 300 of creating thrust may be performed utilizing a combustor that includes a path for the incoming airstream and/or the fuel air mixture stream that is substantially free of drag-inducing structures.

Illustrative, non-exclusive examples of inventive subject matter according to the present disclosure are described in the following enumerated paragraphs:

A. A scramjet, comprising:

a converging inlet configured to compress an incoming air stream;

a combustor comprising a combustion chamber downstream of the converging inlet, wherein the combustor is configured to introduce a fuel stream into the air stream in the combustion chamber to create a fuel air mixture stream, and to ignite and combust the fuel air mixture stream to create an exhaust stream, wherein the combustor comprises a fuel injection system comprising at least one arcjet configured to inject the fuel stream into the air stream in the combustion chamber at a fuel speed that is sufficient to create shear between the fuel stream and the air stream; and a diverging exit nozzle downstream of the combustion chamber and configured to accelerate the exhaust stream to produce thrust of the scramjet.

A1. The scramjet of paragraph A, wherein the air speed of the incoming air stream is supersonic, optionally greater than Mach 2, optionally greater than Mach 4, or optionally greater than Mach 6.

A2. The scramjet of any of paragraphs A-A1, wherein the fuel speed is at least half an air speed of the incoming air stream, at least equal to the air speed of the incoming air stream, at least 2 times the air speed of the incoming air stream, at least 3 times the air speed of the incoming air stream, or at least 4 times the air speed of the incoming air stream.

A2.1 The scramjet of any of paragraphs A-A2, wherein the fuel stream has a longitudinal fuel stream velocity component that is parallel to a flow direction of the incoming air stream, and wherein the longitudinal fuel stream velocity component has a magnitude that is at least half a/the air speed of the incoming air stream, at least equal to the air speed of the incoming air stream, at least 2 times the air speed of the incoming air stream, at least 3 times the air speed of the incoming air stream, or at least 4 times the air speed of the incoming air stream.

A3. The scramjet of any of paragraphs A-A2.1, wherein the at least one arcjet is configured to at least partially ionize the fuel stream as the fuel stream is injected into the air stream.

A4. The scramjet of any of paragraphs A-A3, wherein the at least one arcjet comprises a first electrode and a second electrode, wherein the fuel injection system further comprises an adjustable voltage source configured to apply a voltage across the first electrode and the second electrode.

A4.1. The scramjet of paragraph A4, wherein the fuel injection system is configured to adjust the voltage to adjust the fuel speed.

A4.2. The scramjet of any of paragraphs A4-A4.1, wherein the fuel injection system is configured to adjust the voltage to adjust vorticity of the fuel stream.

A4.3. The scramjet of any of paragraphs A4-A4.2, wherein the fuel injection system is configured to adjust the voltage to adjust a homogeneity of the fuel air mixture stream.

A5. The scramjet of any of paragraphs A-A4.3, wherein the at least one arcjet comprises an arcjet body that defines an internal volume, through which the fuel stream flows when being injected by the at least one arcjet and which defines a/the first electrode, and a/the second electrode extending into the internal volume of the arcjet body, and wherein when a/the voltage is applied across the first electrode and the second electrode, an arc between the first electrode and the second electrode results in a current flow that imparts a (first) magnetic field.

A5.1. The scramjet of paragraph A5, wherein the (first) magnetic field is configured to accelerate the fuel stream as the fuel stream flows through and exits the at least one arcjet.

A5.2. The scramjet of any of paragraphs A5-A5.1, wherein the (first) magnetic field is configured to impart vorticity to the fuel stream as the fuel stream exits the at least one arcjet and enters the air stream to create the fuel air mixture stream.

A6. The scramjet of any of paragraphs A-A5.2, wherein the fuel injection system further comprises at least one magnet associated with the at least one arcjet, wherein the at least one magnet is configured to impart a (second) magnetic field (optionally, when depending from paragraph A5, a cooperative magnetic field).

A6.1. The scramjet of paragraph A6, wherein the (second) magnetic field is configured to accelerate the fuel stream as the fuel stream flows through and exits the at least one arcjet.

A6.2. The scramjet of any of paragraphs A6-A6.1, wherein the (second) magnetic field is configured to impart vorticity to the fuel stream as the fuel stream exits the at least one arcjet and enters the air stream to create the fuel air mixture stream.

A6.3. The scramjet of any of paragraphs A6-A6.2, wherein the at least one arcjet comprises an/the arcjet body, and wherein the at least one magnet extends circumferentially around the arcjet body.

A6.4. The scramjet of any of paragraphs A6-A6.3, wherein the at least one magnet is configured to be selectively translated along an/the arcjet body to alter the (second) magnetic field's effect on the fuel stream as the fuel stream exits the at least one arcjet and enters the air stream to create the fuel air mixture.

A6.5. The scramjet of any of paragraphs A6-A6.4, wherein the fuel injection system is configured to translate the at least one magnet along an/the arcjet body to adjust the fuel speed.

A6.6. The scramjet of any of paragraphs A6-A6.5, wherein the fuel injection system is configured to translate the at least one magnet along an/the arcjet body to adjust vorticity of the fuel stream as the fuel stream exits the at least one arcjet and enters the air stream to create the fuel air mixture stream.

A6.7. The scramjet of any of paragraphs A6-A6.6, wherein the fuel injection system is configured to translate the at least one magnet along an/the arcjet body to adjust a homogeneity of the fuel air mixture stream.

A6.8. The scramjet of any of paragraphs A6-A6.7, wherein the at least one magnet comprises an electromagnet comprised of a current carrying coil, wherein the fuel injection system further comprises a current source operably connected to the current carrying coil, and wherein the fuel injection system is configured to adjust a current in the current carrying coil to adjust the (second) magnetic field.

A6.8.1. The scramjet of paragraph A6.8, wherein the fuel injection system is configured to adjust the current in the current carrying coil to adjust the fuel speed.

A6.8.2. The scramjet of any of paragraphs A6.8-A6.8.1, wherein the fuel injection system is configured to adjust the current in the current carrying coil to adjust vorticity of the fuel stream as the fuel stream exits the at least one arcjet and enters the air stream to create the fuel air mixture stream.

A6.8.3. The scramjet of any of paragraphs A6.8-A6.8.2, wherein the fuel injection system is configured to adjust the current in the current carrying coil to adjust a/the homogeneity of the fuel air mixture stream.

A6.9. The scramjet of any of paragraphs A6-A6.8.3, wherein the at least one magnet comprises a permanent magnet.

A6.10. The scramjet of any of paragraphs A-A6.9, wherein the at least one arcjet is characterized by a fuel injection angle that is measured from a fuel stream flow direction of the fuel stream exiting the arcjet and an air stream flow direction of the air stream.

A6.10.1. The scramjet of paragraph A6.10, wherein at least one arcjet, and optionally each of the at least one arcjet, has a fuel injection angle that is 90 degrees.

A6.10.2. The scramjet of any of paragraphs A6.10-A6.10.1, wherein at least one arcjet, and optionally each of the at least one arcjet, has a fuel injection angle that is between 0 degrees and 90 degrees.

A6.10.3. The scramjet of any of paragraphs A-A6.10.2, wherein at least one arcjet, and optionally each of the at least one arcjet, has a fuel injection angle that is between 90 degrees and 180 degrees.

A6.10.4. The scramjet of any of paragraphs A-A6.10.3, wherein at least one arcjet is has a fuel injection angle that may be selectively adjusted.

A7. The scramjet of any of paragraphs A-A6.10.4, wherein the at least one arcjet comprises an array of arcjets.

A7.1. The scramjet of paragraph A7, wherein the array of arcjets comprises a rectangular array of arcjets, optionally wherein the array of arcjets consists of the rectangular array of arcjets.

A7.2. The scramjet of any of paragraphs A7-A7.1, wherein the array of arcjets comprises a staggered array of arcjets, optionally wherein the array of arcjets consists of the staggered array of arcjets.

A7.3. The scramjet of any of paragraphs A7-A7.2, wherein the combustion chamber is cylindrical, and wherein the array of arcjets extends circumferentially around the combustion chamber.

A7.4. The scramjet of any of paragraphs A7-A7.2, wherein the combustion chamber has a rectangular cross-sectional profile, and wherein the array of arcjets comprises a first array of arcjets positioned on a first side of the rectangular profile and a second array of arcjets positioned on a second side of the rectangular profile opposite the first side.

A7.5. The scramjet of any of paragraphs A7-A7.4, when dependent from paragraph A6.10, wherein each arcjet of the array of arcjets has an identical fuel injection angle.

A7.6. The scramjet of any of paragraphs A7-A7.4, when dependent from paragraph A6.10, wherein at least one arcjet of the array of arcjets has a fuel injection angle that is different than a fuel injection angle of at least one other arcjet of the array of arcjets.

A7.7. The scramjet of any of paragraphs A7-A7.6, when dependent from paragraph A6.10, wherein at least one arcjet of the array of arcjets, and optionally each arcjet of the array of arcjets, has a fuel injection angle that may be at least one of selectively adjusted and actively adjusted.

A8. The scramjet of any of paragraphs A-A7.4, wherein the combustor further comprises at least one igniter configured to ignite the fuel air mixture stream downstream of the at least one arcjet.

A8.1. The scramjet of paragraph A8, wherein the at least one igniter is configured to ignite the fuel air mixture stream in the combustion chamber only when the air speed is below a threshold speed, and wherein the combustor is configured to spontaneously ignite the fuel air mixture stream in the combustion chamber when the air speed is at or above the threshold speed.

A8.1.1. The scramjet of paragraph A8.1, wherein the threshold speed is equal to or less than one of Mach 2, Mach 4, or Mach 6.

A9. The scramjet of any of paragraphs A-A7.4, wherein the combustor is configured to spontaneously ignite the fuel air mixture stream in the combustion chamber as a result of properties of one or more of the air stream, the fuel stream, and/or the fuel air mixture stream.

A9.1. The scramjet of paragraph A9, wherein the properties comprise a temperature of the air stream when the fuel stream is injected into the air stream by the at least one arcjet.

A9.2. The scramjet of any of paragraphs A9-A9.1, wherein the properties comprise a temperature of the fuel stream when the fuel stream is injected into the air stream by the at least one arcjet.

A9.3. The scramjet of any of paragraphs A9-A9.2, wherein the combustor is free of igniters configured to introduce an ignition source into the combustion chamber for igniting the fuel air mixture stream.

A10. The scramjet of any of paragraphs A-A9.3, wherein the combustor further comprises at least one turbulator structure within the combustion chamber configured to physically introduce turbulence into the fuel air mixture stream as the fuel air mixture stream passes through the combustion chamber.

A11. The scramjet of any of paragraphs A-A9.2, wherein the combustor is free of turbulator structures within the combustion chamber configured to physically introduce turbulence into the fuel air mixture stream as the fuel air mixture stream passes through the combustion chamber.

A12. The scramjet of any of paragraphs A-A11, wherein the combustor further comprises a flame holder structure within the combustion chamber configured to maintain combustion of the fuel air mixture stream in the combustion chamber.

A13. The scramjet of any of paragraphs A-A11, wherein the combustor is free of a flame holder structure within the combustion chamber configured to maintain combustion of the fuel air mixture stream in the combustion chamber.

A14. The scramjet of any of paragraphs A-A13, wherein the scramjet is configured to perform the method of any of paragraphs D-D8.

B. An aircraft, comprising:
an aircraft body; and
the scramjet of any of paragraphs A-A14 supported by the body.

C. The use of the scramjet of any of paragraphs A-A13 to provide thrust to an aircraft.

D. A method of creating thrust for an aircraft, comprising:
compressing a supersonic incoming air stream in a converging inlet
injecting a fuel stream into the air stream in a combustion chamber downstream of the converging inlet to create a fuel air mixture stream;
igniting the fuel air mixture stream in the combustion chamber;
maintaining combustion of the fuel air mixture stream in the combustion chamber to create an exhaust stream; and
exhausting the exhaust stream from a diverging exit nozzle downstream of the combustion chamber.

D1. The method of paragraph D, wherein the injecting comprises injecting the fuel stream at a fuel speed that is at least half an air speed of the incoming air stream, at least equal to the air speed of the incoming air stream, at least 2 times the air speed of the incoming air stream, at least 3 times the air speed of the incoming air stream, or at least 4 times the air speed of the incoming air stream.

D1.1 The method of paragraph D1, wherein the injecting comprises injecting the fuel stream with a longitudinal fuel stream velocity component that is parallel to a flow direction of the incoming air stream, and wherein the longitudinal fuel stream velocity component has a magnitude that is at least half a/the air speed of the incoming air stream, at least equal to the air speed of the incoming air stream, at least 2 times the air speed of the incoming air stream, at least 3 times the air speed of the incoming air stream, or at least 4 times the air speed of the incoming air stream.

D1.2. The method of any of paragraphs D1-D1.1, wherein the air speed of the incoming air stream is greater than Mach 2, optionally greater than Mach 4, or optionally greater than Mach 6.

D1.3. The method of any of paragraphs D-D1.2, wherein the injecting comprises actively adjusting a/the fuel speed of the fuel stream as the fuel stream is injected into the air stream.

D2. The method of any of paragraphs D-D1.3, wherein the fuel stream has a fuel stream flow direction, wherein the air stream has an air stream flow direction, and wherein the injecting includes injecting the fuel stream with at least one fuel injection angle that is measured from the fuel stream flow direction to the air stream flow direction.

D2.1. The method of paragraph D2, wherein the injecting includes injecting with at least one fuel injection angle that is 90 degrees.

D2.2. The method any of paragraphs D2-D2.1, wherein the injecting includes injecting with at least one fuel injection angle that is between 0 degrees and 90 degrees.

D2.3. The method of any of paragraphs D2-D2.2, wherein the injecting includes injecting with at least one fuel injection angle that is between 90 degrees and 180 degrees.

D2.4. The method of any of paragraphs D2-D2.3, wherein the injecting includes actively adjusting at least one fuel injection angle.

D3. The method of any of paragraphs D-D2, wherein the injecting comprises ionizing the fuel stream.

D4. The method of any of paragraphs D-D3, wherein the injecting comprises applying a magnetic field to the fuel stream as the fuel stream is injected into the air stream.

D4.1. The method of paragraph D4, wherein the magnetic field imparts vorticity to the fuel stream as the fuel stream is injected into the air stream.

D4.2. The method of any of paragraphs D4-D4.1, wherein the applying the magnetic field comprises actively altering the magnetic field to adjust a homogeneity of the fuel air mixture stream.

D5. The method of any of paragraphs D-D4.2, wherein the injecting comprises injecting the fuel stream into the air stream from an array of discrete locations.

D5.1. The method of paragraph D5, wherein the array of discrete locations comprises a rectangular array of discrete locations, optionally wherein the array of discrete locations consists of the rectangular array of discrete locations.

D5.2. The method of any of paragraphs D5-D5.1, wherein the array of discrete locations comprises a staggered array of discrete locations, optionally wherein the array of discrete locations consists of the staggered array of discrete locations.

D6. The method of any of paragraphs D-D5.2, wherein the igniting comprises spontaneously igniting the fuel air mixture stream.

D7. The method of any of paragraphs D-D6, wherein the maintaining combustion is accomplished without a flame holder structure within the combustion chamber.

D8. The method of any of paragraphs D-D7, performed by the scramjet of any of paragraphs A-A13.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A scramjet, comprising:
a converging inlet configured to compress an incoming air stream;
a combustor comprising a combustion chamber downstream of the converging inlet, wherein the combustor is configured to introduce a fuel stream into the incoming air stream in the combustion chamber to create a fuel air mixture stream, and to ignite and combust the fuel air mixture stream to create an exhaust stream, wherein the combustor comprises a fuel injection system comprising at least one arcjet configured to inject the fuel stream into the incoming air stream in the combustion chamber at a fuel speed that is sufficient to create a shear between the fuel stream and the incoming air stream; and
a diverging exit nozzle downstream of the combustion chamber and configured to accelerate the exhaust stream to produce thrust of the scramjet;
wherein the fuel injection system further comprises at least one magnet associated with the at least one arcjet; wherein the at least one magnet is configured to impart a first magnetic field; wherein the first magnetic field is configured to impart a first vorticity to the fuel stream as the fuel stream exits the at least one arcjet and enters the incoming air stream to create the fuel air mixture stream; wherein the at least one arcjet comprises an arcjet body; wherein the at least one magnet extends circumferentially around the arcjet body; and wherein the at least one magnet is configured to be selectively translated along the arcjet body to alter an effect of the first magnetic field on the fuel stream as the fuel stream exits the at least one arcjet and enters the incoming air stream to create the fuel air mixture stream.

2. The scramjet of claim 1, wherein the fuel injection system is configured to translate the at least one magnet along the arcjet body to adjust a homogeneity of the fuel air mixture stream.

3. The scramjet of claim 1, wherein the incoming air stream has an air speed that is supersonic, and wherein the fuel speed is at least two times the air speed of the incoming air stream.

4. The scramjet of claim 1, wherein the first magnetic field is configured to accelerate the fuel stream as the fuel stream flows through and exits the at least one arcjet.

5. The scramjet of claim 1, wherein the at least one magnet comprises an electromagnet that includes a current carrying coil, wherein the fuel injection system further comprises a current source operably connected to the current carrying coil, and wherein the fuel injection system is configured to adjust a current in the current carrying coil to adjust the first magnetic field.

6. The scramjet of claim 1, wherein the at least one magnet comprises a permanent magnet.

7. The scramjet of claim 1, wherein the at least one arcjet is configured to ionize the fuel stream as the fuel stream is injected into the incoming air stream.

8. The scramjet of claim 1,
wherein the at least one arcjet comprises a first electrode and a second electrode, wherein the fuel injection system further comprises an adjustable voltage source configured to apply a voltage across the first electrode and the second electrode; and
wherein the fuel injection system is configured to adjust the voltage to adjust the fuel speed.

9. The scramjet of claim 1, wherein the at least one arcjet comprises a first electrode and a second electrode, wherein the fuel injection system further comprises an adjustable voltage source configured to apply a voltage across the first electrode and the second electrode; and wherein the fuel injection system is configured to adjust the voltage to adjust the first vorticity of the fuel stream.

10. The scramjet of claim 1,
wherein the at least one arcjet comprises a first electrode and a second electrode, wherein the fuel injection system further comprises an adjustable voltage source configured to apply a voltage across the first electrode and the second electrode; and
wherein the fuel injection system is configured to adjust the voltage to adjust a homogeneity of the fuel air mixture stream.

11. The scramjet of claim 1, wherein the arcjet body of the at least one arcjet defines an internal volume, through which the fuel stream flows when being injected by the at least one arcjet and which defines a first electrode, and a second electrode extending into the internal volume of the arcjet body, and wherein when a voltage is applied across the first electrode and the second electrode, an arc between the first electrode and the second electrode results in a current flow that imparts a second magnetic field; and wherein the second magnetic field is configured to impart a second vorticity to the fuel stream as the fuel stream exits the at least one arcjet and enters the incoming air stream to create the fuel air mixture stream.

12. The scramjet of claim 1,
wherein the at least one arcjet comprises an array of arcjets; and
wherein the array of arcjets comprises a rectangular array of arcjets.

13. The scramjet of claim 1, wherein the at least one arcjet comprises an array of arcjets; and wherein the array of arcjets comprises a staggered array of arcjets.

14. The scramjet of claim 1,
wherein the combustor further comprises at least one igniter configured to ignite the fuel air mixture stream downstream of the at least one arcjet; and
wherein the at least one igniter is configured to ignite the fuel air mixture stream in the combustion chamber only when an air speed of the incoming air stream is below a threshold speed, and wherein the combustor is configured to spontaneously ignite the fuel air mixture stream in the combustion chamber when the air speed is at or above the threshold speed.

15. The scramjet of claim 1, wherein the combustor is configured to spontaneously ignite the fuel air mixture stream in the combustion chamber as a result of properties of one or more of the incoming air stream, the fuel stream, and/or the fuel air mixture stream.

16. The scramjet of claim 15, wherein the combustor is free of igniters configured to introduce an ignition source into the combustion chamber for igniting the fuel air mixture stream.

17. The scramjet of claim 1, wherein the combustor is free of turbulator structures within the combustion chamber configured to physically introduce turbulence into the fuel air mixture stream as the fuel air mixture stream passes through the combustion chamber.

18. The scramjet of claim 1, wherein the combustor is free of a flame holder structure within the combustion chamber configured to maintain combustion of the fuel air mixture stream in the combustion chamber.

19. An aircraft, comprising:
an aircraft body; and
a scramjet supported by the aircraft body;
wherein the scramjet comprises:
a converging inlet configured to compress an incoming air stream;
a combustor comprising a combustion chamber downstream of the converging inlet, wherein the combustor is configured to introduce a fuel stream into the incoming air stream in the combustion chamber to create a fuel air mixture stream, and to ignite and combust the fuel air mixture stream to create an exhaust stream, wherein the combustor comprises a fuel injection system comprising at least one arcjet configured to inject the fuel stream into the incoming air stream in the combustion chamber at a fuel speed that is sufficient to create a shear between the fuel stream and the incoming air stream; and
a diverging exit nozzle downstream of the combustion chamber and configured to accelerate the exhaust stream to produce thrust of the scramjet;
wherein the fuel injection system further comprises at least one magnet associated with the at least one arcjet;
wherein the at least one magnet is configured to impart a magnetic field;
wherein the magnetic field is configured to impart vorticity to the fuel stream as the fuel stream exits the at least one arcjet and enters the incoming air stream to create the fuel air mixture stream; wherein the at least one arcjet comprises an arcjet body; wherein the at least one magnet extends circumferentially around the arcjet body; and wherein the at least one magnet is configured to be selectively translated along the arcjet body to alter an effect of the magnetic field on the fuel stream as the fuel stream exits the at least one arcjet and enters the incoming air stream to create the fuel air mixture stream.

20. A method of creating thrust for an aircraft, comprising:
providing an aircraft body;
providing a scramjet supported by the aircraft body, wherein the scramjet comprises:
a converging inlet configured to compress an incoming air stream;
a combustor comprising a combustion chamber downstream of the converging inlet, wherein the combustor is configured to introduce a fuel stream into the incoming air stream in the combustion chamber to create a fuel air mixture stream, and to ignite and combust the fuel air mixture stream to create an exhaust stream, wherein the combustor comprises a fuel injection system comprising at least one arcjet configured to inject the fuel stream into the incoming air stream in the combustion chamber at a fuel speed that is sufficient to create a shear between the fuel stream and the incoming air stream; and a diverging exit nozzle downstream of the combustion chamber and configured to accelerate the exhaust stream to produce thrust of the scramjet;

wherein the fuel injection system further comprises at least one magnet associated with the at least one arcjet; wherein the at least one magnet is configured to impart a magnetic field;

wherein the magnetic field is configured to impart vorticity to the fuel stream as the fuel stream exits the at least one arcjet and enters the incoming air stream to create the fuel air mixture stream; wherein the at least one arcjet comprises an arcjet body; wherein the at least one magnet extends circumferentially around the arcjet body; and wherein the at least one magnet is configured to be selectively translated along the arcjet body to alter an effect of the magnetic field on the fuel stream as the fuel stream exits the at least one arcjet and enters the incoming air stream to create the fuel air mixture stream;

compressing the incoming air stream in the converging inlet;

injecting the fuel stream into the incoming air stream in the combustion chamber downstream of the converging inlet to create the fuel air mixture stream;

igniting the fuel air mixture stream in the combustion chamber;

maintaining combustion of the fuel air mixture stream in the combustion chamber to create the exhaust stream; and exhausting the exhaust stream from the diverging exit nozzle downstream of the combustion chamber; and wherein the injecting comprises injecting the fuel stream with the at least one arcjet at the fuel speed that is sufficient to create the shear between the fuel stream and the incoming air stream.

* * * * *